N. T. Coffin,
Saw.
N° 14,305.
Patented Feb. 26, 1856.
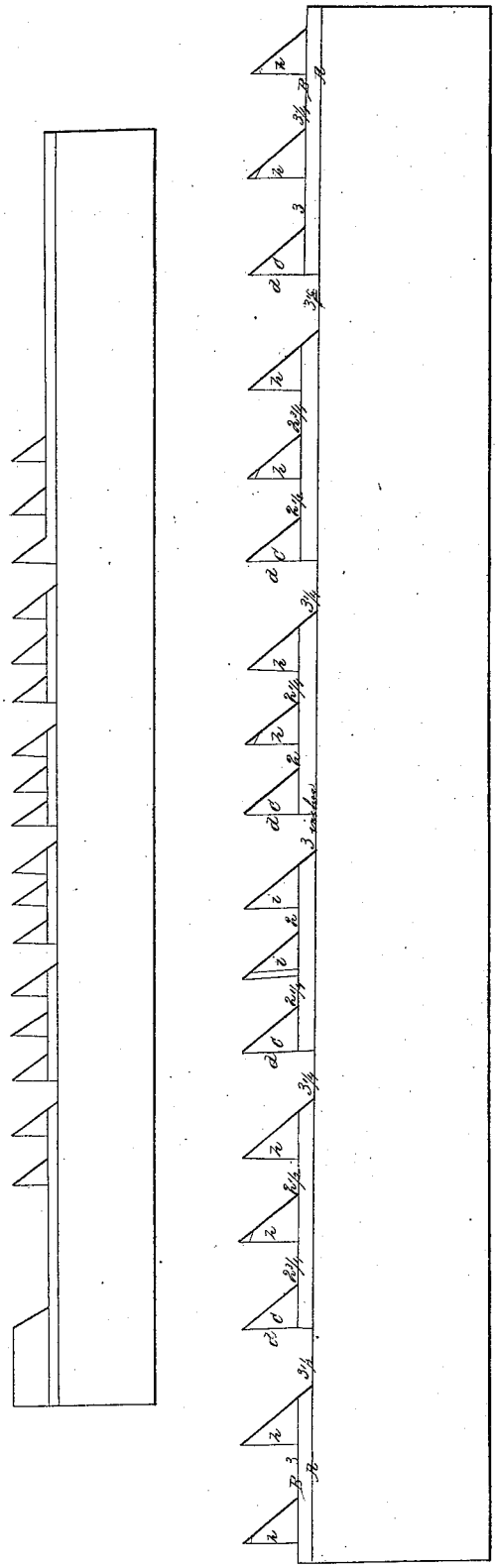

UNITED STATES PATENT OFFICE.

NATHAN T. COFFIN, OF KNIGHTSTOWN, INDIANA.

MILL-SAW.

Specification of Letters Patent No. 14,305, dated February 26, 1856.

*To all whom it may concern:*

Be it known that I, NATHAN T. COFFIN, of Knightstown, in the county of Henry and State of Indiana, have invented a new and useful Improvement in Mill-Saws; and I do hereby declare that the following is a full and exact description thereof, reference being had to the accompanying drawings, and to the letters and figures of reference marked thereon, forming a part of this specification, in which—

Letters *d d d d d* show the wide spaces under the lower tooth of each set of teeth. The figures (representing inches,) on the lines A A and B, B show the gradual increase of the spaces between the teeth, from the center of the saw each way to the ends.

The letters *c c c c c* is the straight square edged teeth.

The letters *h h h h h h h h h h* is the diamond or bevel pointed teeth.

The letter *i i* is the planing or traversing teeth. The lines A A and B, B also, show the difference of the depths of the spaces, or the length of the teeth.

The nature of my invention consists in arranging the common shaped teeth on a saw blade in sets of three each, with a wide, deep space under the lower tooth of each set of teeth, for the reception of a large amount of saw dust, which is produced by these teeth. Also, the spaces between all the teeth are gradually increased from the center of the saw each way to the ends, thereby getting a much less number of teeth on the saw blade, and still leaving the necessary number of teeth in the center of the saw, which part of the saw performs the principal part of the work, leaving but few teeth at the ends, where but little work is performed. This arrangement of the teeth helps, greatly, to equalize the wear of the teeth, and prevent the saw from becoming hollow on the edge, as is the case in the common arrangement of the teeth, and requires much less filing at the ends, from the fact of there being much less number of teeth to file. With this arrangement of teeth, seventeen performs the work of twenty-six, when spaced in the ordinary way. The experiment has often been tried of using saws with a less number of teeth, necessarily increasing the spaces between the teeth in the middle of the saw as well as at the ends, but the difficulty was, that each tooth in the middle of the saw had to perform too heavy a cut, causing them to make the lumber rough, and also tear or sliver at the bottom of the cut. But in this improvement, the teeth being properly spaced in the center of the saw, and gradually increasing the size of the spaces between the teeth, from the center of the saw, toward each end, entirely overcomes this difficulty, and still greatly decreases the number of teeth.

In the process of dressing and setting the teeth of the saw ready for use, it is necessary, first, that the teeth be all jointed in the ordinary way, and then all filed square on both edges, (except the two planing or traversing teeth, a little below the center of the saw, which are filed square on the top and beveling on the bottom). The two upper teeth of each set of teeth are set alternate in the common way, with their points filed beveling, leaving the out corner the longest. The lower tooth of each set of teeth is left straight with the blade of the saw, having their points spread, which is done with a forked punch, or otherwise, giving them nearer the requisite set with the balance of the teeth. Also, two teeth a little below the center of the saw are used as planers or traversers, their under edges being filed beveling alternate, by which beveling is formed a cutter on each side of the saw. These bevel edged teeth are at the bottom of the log when the saw is at its lowest downward extremity, and pass up double the length of the crank, which causes them to act, as the saw passes downward, upon both faces of the kerf of the saw, in an ordinary sized log, and by their being set a little wider than the balance of the teeth, they completely traverse or plane the whole face of the kerf of the saw on both of its sides, and has no bad effects upon the operation of the saw, but removes all furze which naturally originates in tough or soft timber, and which often causes the saw blade to heat and draw from a true line.

The arranging of the teeth upon the saw blade, and the dressing, setting and filing of the same being performed as herein described, and the points of all the teeth being slightly tapped down with the hammer, or otherwise, the saw is then ready for use.

The advantages gained in the foregoing improvements are very obvious to those acquainted with the practical operation of the vertical, or common mill saw. First, a large portion of the work is performed by teeth standing straight and firm with the blade of the saw, and have no inclination to loose their set, while the diamond or bevel pointed teeth are performing their part of the work on the sides of the kerf, and are inclined to hold or bear one against the other, which guides or steadies the saw, and prevents it from dodging when forced with a heavy feed. Also, the arranging and proportioning of the teeth to suit the amount of work which they are required to perform is of great advantage. Also, the simple construction of the planing or traversing teeth is one of much importance.

I do not claim the spreading of the square edged teeth by the use of the forked punch or otherwise. Nor do I claim the bevel or diamond pointed teeth, nor the tapping down or turning of the points of the teeth by the use of the hammer, or otherwise; but, What I do claim, and desire to secure by these Letters Patent is—

The arrangement of the common shaped mill-saw teeth, on the blade, in sets of three teeth each, with a wide, deep space under the lower tooth of each set of teeth. Also, the increasing of the spaces of the teeth from the center of the saw, each way to the ends. Also, the regular combination of the square edged, and the diamond or bevel pointed teeth, the former standing straight with the blade.

In testimony whereof, I have hereunto signed my name before two subscribing witnesses.

NATHAN T. COFFIN.

Witnesses:
C. H. BUELL,
T. D. CLARKSON.